United States Patent
Otoguro et al.

(10) Patent No.: US 10,829,156 B2
(45) Date of Patent: Nov. 10, 2020

(54) VEHICLE LOWER STRUCTURE

(71) Applicant: TOYOTA JIDOSHA KABUSHIKI KAISHA, Aichi-ken (JP)

(72) Inventors: Kazuma Otoguro, Toyota (JP); Yuya Saruwatari, Toyota (JP); Toshiharu Shinya, Toyota (JP); Shinobu Tanaka, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/296,229

(22) Filed: Mar. 8, 2019

(65) Prior Publication Data

US 2019/0276081 A1 Sep. 12, 2019

(30) Foreign Application Priority Data

Mar. 9, 2018 (JP) ................. 2018-042755

(51) Int. Cl.
*B62D 21/03* (2006.01)
*B60K 1/04* (2019.01)
*B62D 25/02* (2006.01)

(52) U.S. Cl.
CPC ........... *B62D 21/03* (2013.01); *B60K 1/04* (2013.01); *B60K 2001/0438* (2013.01); *B60Y 2200/91* (2013.01); *B62D 25/025* (2013.01)

(58) Field of Classification Search
CPC .. B60Y 2306/01; B62D 21/157; B62D 21/03; B60K 2001/0438
See application file for complete search history.

(56) References Cited

U.S. PATENT DOCUMENTS

| | | | | |
|---|---|---|---|---|
| 8,936,125 | B2 * | 1/2015 | Nakamori | B60K 1/04 180/68.5 |
| 2008/0173489 | A1 * | 7/2008 | Takasaki | B60K 1/04 180/68.5 |
| 2009/0152034 | A1 * | 6/2009 | Takasaki | B60K 1/04 180/68.5 |
| 2016/0068195 | A1 * | 3/2016 | Hentrich | B60K 1/04 180/68.5 |
| 2016/0288636 | A1 * | 10/2016 | Kamimura | B62D 25/2036 |
| 2018/0370577 | A1 * | 12/2018 | Takahashi | B62D 25/2036 |
| 2019/0315217 | A1 * | 10/2019 | Hohm | B62D 25/20 |

FOREIGN PATENT DOCUMENTS

JP 2015-615 A 1/2015

* cited by examiner

*Primary Examiner* — Brian L Swenson
(74) *Attorney, Agent, or Firm* — Hauptman Ham, LLP

(57) ABSTRACT

A vehicle lower structure includes: a battery pack provided under a floor of a vehicle cabin; a framework member fixed to a bottom surface of the case, the framework member extending across the case in a vehicle width direction; a first extension framework member detachably attached to one end of the framework member in the vehicle width direction such that at least one of distal ends of the first extension framework member in the vehicle width direction is located outward of one end of the case in the vehicle width direction; and a second extension framework member detachably attached to the other end of the framework member in the vehicle width direction such that at least one of distal ends of the second extension framework member in the vehicle width direction is located outward of the other end of the case in the vehicle width direction.

20 Claims, 8 Drawing Sheets

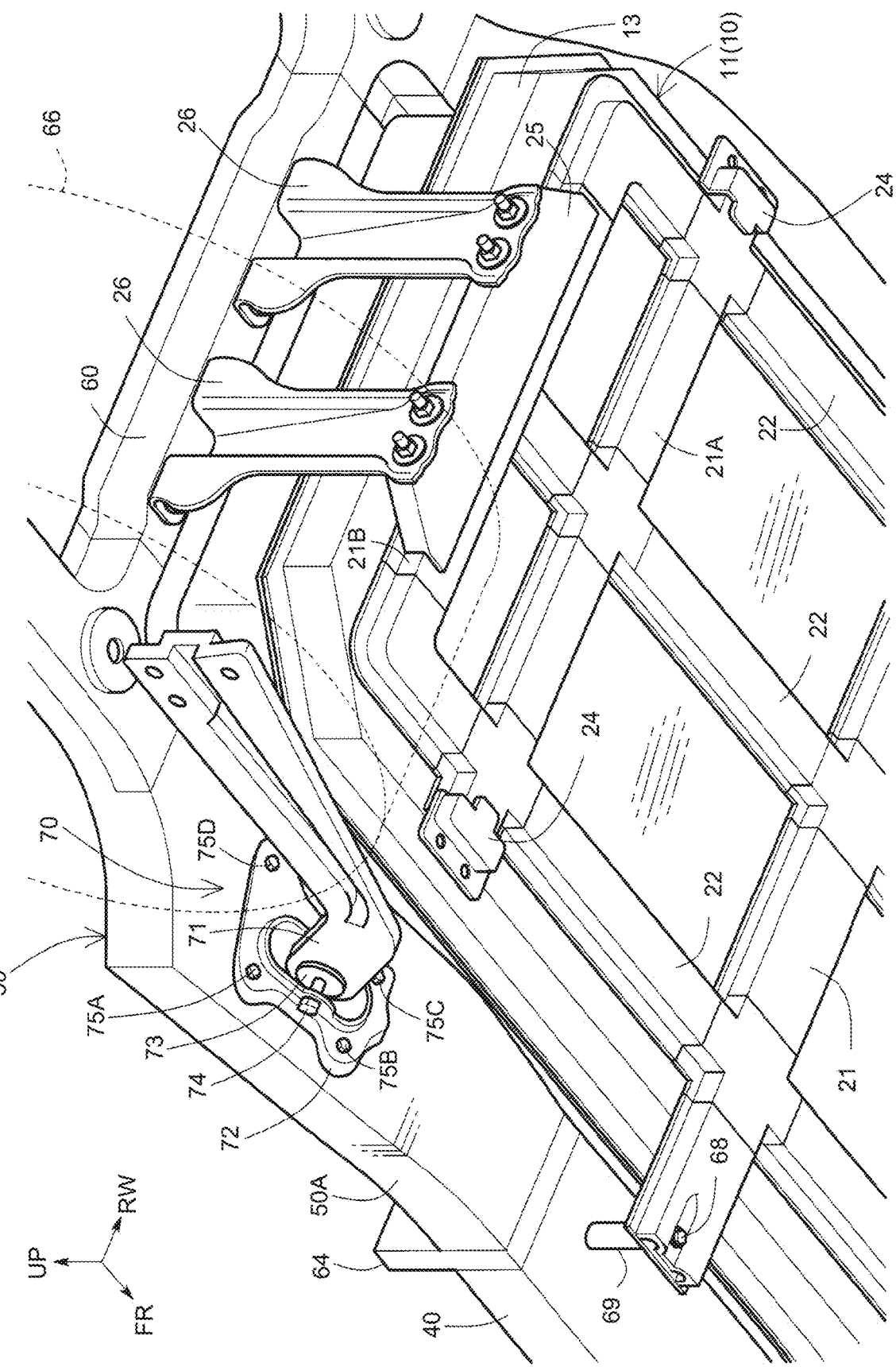

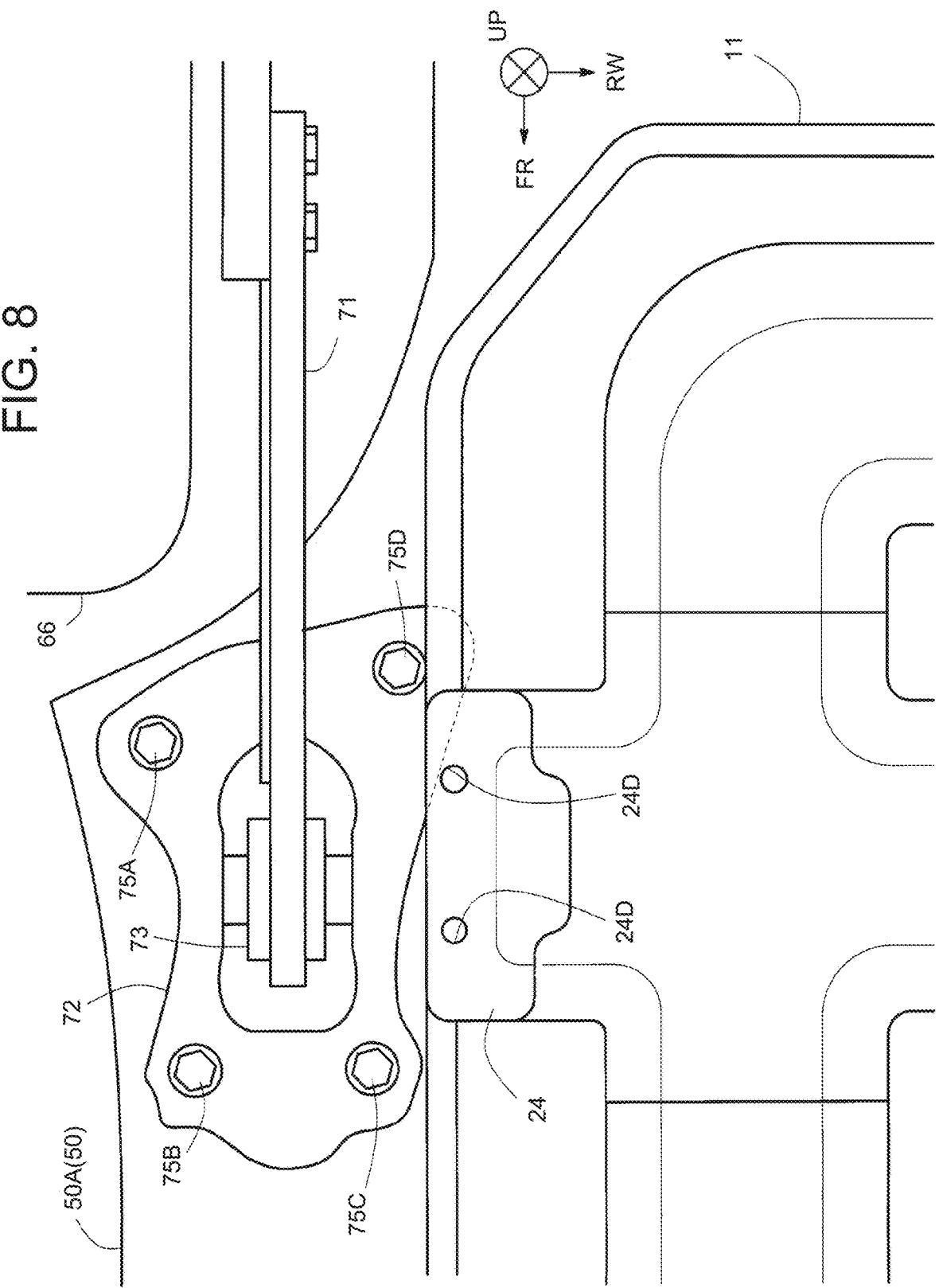

VEHICLE LOWER STRUCTURE

INCORPORATION BY REFERENCE

The disclosure of Japanese Patent Application No. 2018-042755 filed on Mar. 9, 2018 including the specification, drawings and abstract is incorporated herein by reference in its entirety.

BACKGROUND

1. Technical Field

The present disclosure relates to a vehicle lower structure.

2. Description of Related Art

A vehicle using a rotating electric machine as a driving source, such as an electric vehicle, is equipped with a battery as a power source. For example, in Japanese Patent Application Publication No. 2015-615, a battery pack is disposed under a luggage floor on a rear side of a vehicle.

SUMMARY

To protect a battery pack in the event of a lateral collision of the vehicle, it is conceivable to provide the battery pack with a battery cross member that is a framework member extending in a vehicle width direction.

For example, a structure in which a battery cross member is provided outside a battery pack and moreover both ends of the battery cross member are projected toward an outer side in the vehicle width direction from both ends of the battery pack in the vehicle width direction, is adopted to be able to receive an obstacle (barrier) by the battery cross member during a lateral collision, at a stage before the obstacle collides with the battery pack.

In the case where a battery pack is provided under the floor of a vehicle, if the battery cross member having the projecting structure is provided on an upper surface of the battery pack, it may become difficult to install the battery pack under the floor due to interference between a vehicle component under the floor and the battery cross member. Then, it is conceivable to provide the battery cross member on a bottom surface of the battery pack.

In the above structure, when a vehicle component is disposed in a space spreading upward from a projecting portion of the battery cross member (a portion thereof projecting from the battery pack) to a bottom surface of the floor, this projecting portion of the battery cross member makes accessing the vehicle component difficult. For example, if one tries to access the vehicle component from a bottom side of the vehicle, the projecting battery cross member gets in the way, making it difficult to insert a tool into the vehicle component etc. Thus, for example, replacing the vehicle component involves removing the whole battery pack from the floor, which may reduce the efficiency of maintenance work. The present disclosure provides a vehicle lower structure that can protect a battery pack while avoiding reducing the efficiency of maintenance work of a vehicle component around the battery pack.

A vehicle lower structure according to a first aspect of the present disclosure includes: a battery pack provided under a floor of a vehicle cabin, the battery pack including a case that houses a battery stack; a framework member fixed to a bottom surface of the case, the framework member extending across the case in a vehicle width direction; a first extension framework member detachably attached to one end of the framework member in the vehicle width direction such that at least one of distal ends of the first extension framework member in the vehicle width direction is located outward of one end of the case in the vehicle width direction; and a second extension framework member detachably attached to the other end of the framework member in the vehicle width direction such that at least one of distal ends of the second extension framework member in the vehicle width direction is located outward of the other end of the case in the vehicle width direction.

According to this configuration, each of the extension framework members is detachably attached to the framework member, so that it is possible to access a vehicle component disposed above the extension framework member simply by removing the extension framework member.

In the above aspect, the vehicle lower structure may further include an arm bracket provided above each of the first extension framework member and the second extension framework member, the arm bracket supporting a rotating shaft of a trailing arm.

The arm bracket is accessed from outside the vehicle and removed for replacement of a rotating shaft mechanism due to fatigue or damage or for a tune-up of a so-called chassis. According to this configuration, it is possible to access the arm bracket simply by removing the extension framework member during the work of removing the arm bracket, so that reduction of the efficiency of the removal work can be avoided.

In the above aspect, the first extension framework member and the second extension framework member may be attached to the framework member by bolt fastening.

According to this configuration, the extension framework members can be removed by using a common tool, so that complicating the work can be avoided.

In the above aspect, each of the framework member, the first extension framework member and the second extension framework member may include a plate extending in the vehicle width direction; and the first extension framework member and the second extension framework member may be attached to the framework member such that heights of the plate of the framework member, the plate of the first extension framework member, and the plate of the second extension framework member are aligned.

According to this configuration, when the plate of the extension framework member receives a lateral collision load during a lateral collision, the lateral collision load is transmitted to the plate of the framework member located on an inner side of the extension framework member in the vehicle width direction. The framework member and the extension framework member receive the lateral collision load and cooperate with each other to push against the barrier, so that damage to the battery pack can be avoided.

In the above aspect, a dimension of the framework member in the vehicle width direction may be equal to or shorter than a dimension of the battery pack in the vehicle width direction.

According to these aspects of the present disclosure, it is possible to protect a battery pack while avoiding reducing the efficiency of maintenance work of a vehicle component around the battery pack.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a perspective view illustrating the structure on the rear side of the vehicle lower part, with an extension detached; and FIG. 8 is a bottom view illustrating the structure on the rear side of the vehicle lower part, with the extension detached.

DETAILED DESCRIPTION OF EMBODIMENTS

A vehicle lower structure according to an embodiment will be described with reference to FIG. 1 to FIG. 8. In FIG. 1 to FIG. 8, a vehicle front-rear direction (hereinafter written as a vehicle length direction as appropriate) is indicated by an axis denoted by reference sign FR; a vehicle width direction (hereinafter written as a vehicle width direction as appropriate) is indicated by an axis denoted by reference sign RW; and a vertical direction (hereinafter written as a vehicle height direction as appropriate) is indicated by an axis denoted by reference sign UP. Reference sign FR is short for front, and a direction toward a vehicle front side is a positive direction along the vehicle length-direction axis FR. Reference sign RW is short for right width, and a direction toward a right side in the vehicle width direction is a positive direction along the vehicle width-direction axis RW. A direction toward an upper side is a positive direction along the vehicle height-direction axis UP.

Figure 1:
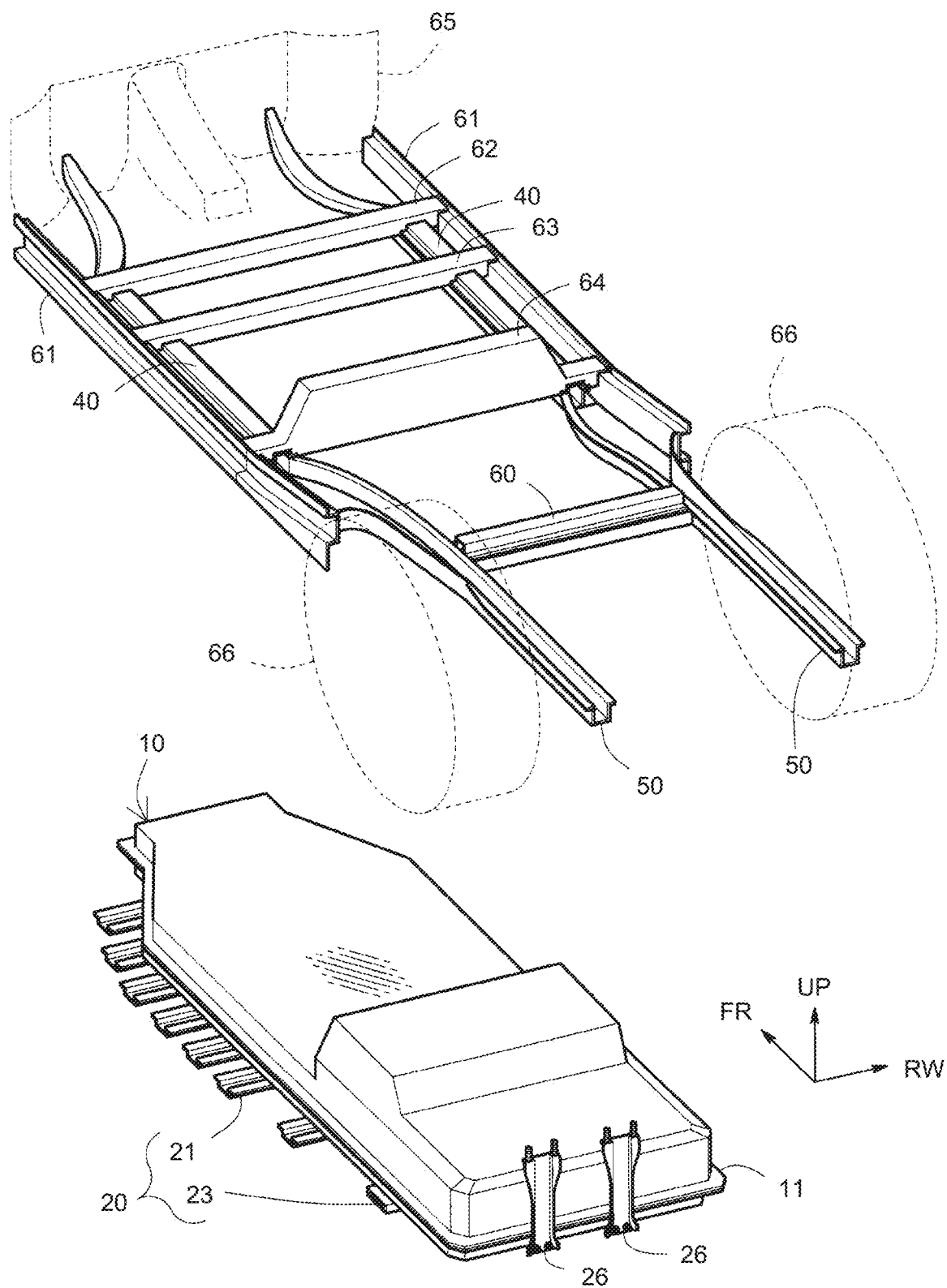
FIG. 1 is an exploded perspective view illustrating a vehicle lower structure according to an embodiment.

FIG. 1 illustrates an exploded perspective view of the vehicle lower structure according to the embodiment. The vehicle lower structure according to the embodiment is installed, for example, in an electric vehicle.

Figure 3:
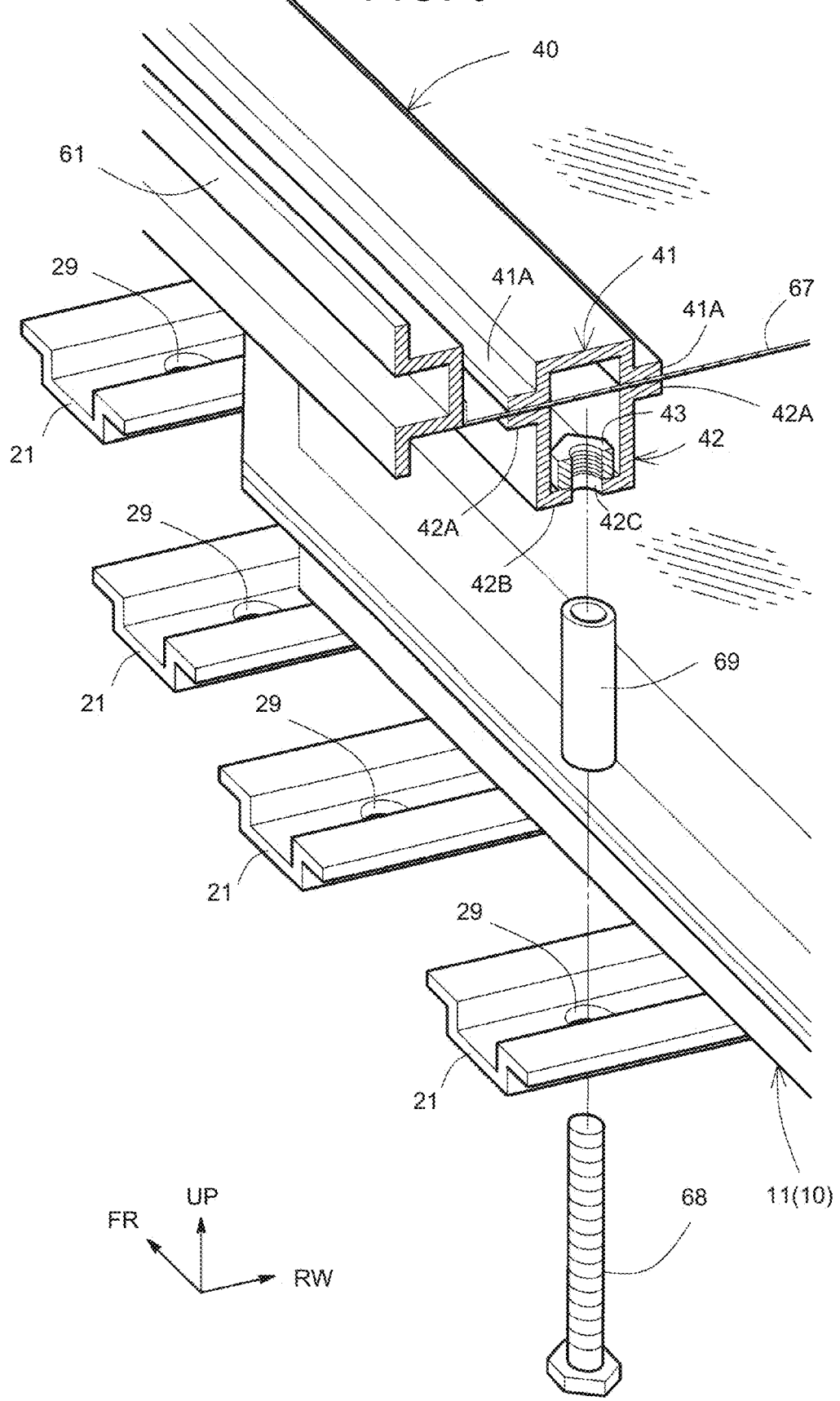
FIG. 3 is an exploded perspective view illustrating a fastening structure on a front side of the battery pack.
Figure 4:
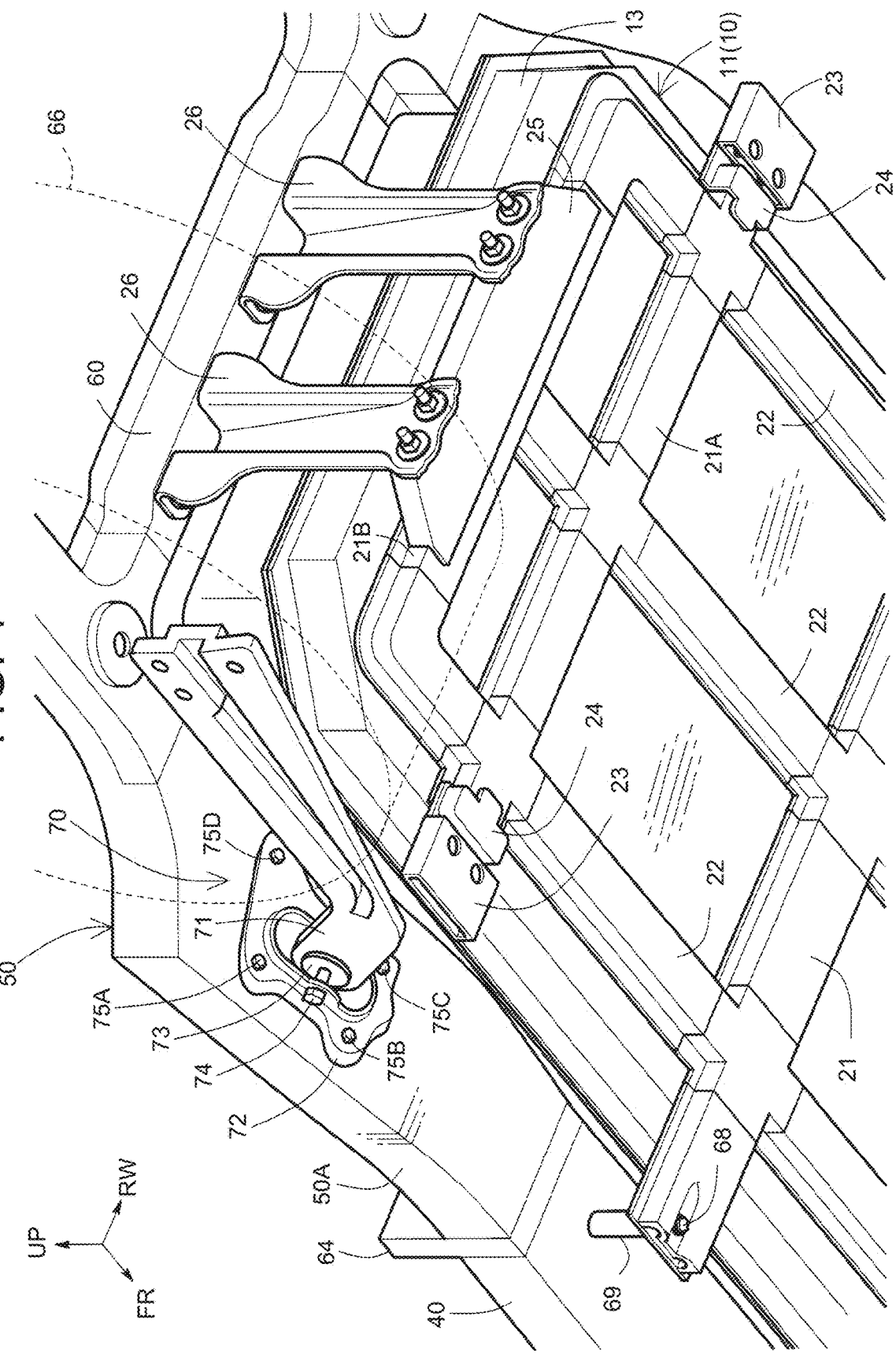
FIG. 4 is a perspective view illustrating a structure on a rear side of a vehicle lower part.

Referring to FIG. 1, the vehicle lower structure according to the embodiment includes a battery pack 10, a battery pack framework structure 20, front side members 40, rear side members 50, a rear cross member 60, and a trailing arm mechanism 70 (see FIG. 4). In FIG. 1, a floor panel 67 (see FIG. 3) forming a floor surface of a vehicle cabin is not shown.

The vehicle lower structure in this embodiment is provided with framework members that maintain the rigidity of the vehicle. Specifically, the pair of front side members 40, 40 and the pair of rear side members 50, 50 are provided as the framework members. Further, a pair of rockers 61, 61 is provided farther on an outer side in the vehicle width direction than the pair of front side members 40, 40. As shown in FIG. 1, all of these framework members extend in the vehicle length direction.

As further framework members, a first cross member 62 and a second cross member 63 are provided so as to connect the pair of rockers 61, 61 to each other. A center floor cross member 64 is provided farther on the rear side of these cross members. In addition, the rear cross member 60 is provided so as to connect the pair of rear side members 50, 50 to each other. As shown in FIG. 1, all of these framework members extend in the vehicle width direction.

The front side members 40 are framework members that extend in the vehicle length direction, from a front bumper reinforcement (not shown) at a front end of the vehicle through a dashboard panel 65 to a floor of the vehicle cabin. The front side members 40 are provided as a pair, one on each side of the floor in the vehicle width direction. The pair of front side members 40, 40 extends in parallel to the pair of rockers 61, 61 that is provided one at each end of the floor on the outer side in the vehicle width direction and extends in the vehicle length direction.

As illustrated in FIG. 3, the front side member 40 includes an upper front side member 41 that is disposed on an upper surface of the floor panel 67, and a lower front side member 42 that is disposed on a lower surface of the floor panel 67. The upper front side member 41 and the lower front side member 42 each have a hat shape as seen from a rear side, and are installed one on top of the other with open ends facing each other. Further, flanges 41A, 42A corresponding to brims of the hats are joined together by welding etc. along with the floor panel 67. Thus, a closed cross-sectional structure of the front side member 40 is formed.

An opening 42C is formed in a bottom wall 42B of the lower front side member 42 so as to extend through the bottom wall 42B in a thickness direction thereof (vehicle height direction). Moreover, a weld nut 43 is provided on the bottom wall 42B of the lower front side member 42 such that an axis of the weld nut 43 coincides with a central axis of the opening 42C. As will be described later, the battery pack 10 is hung from and supported by the front side member 40 as a bolt 68 is screwed into the weld nut 43.

Referring to FIG. 1, the pair of front side members 40, 40 is connected to the pair of rear side members 50, 50. The rear side members 50 are connected at front ends to rear ends of the front side members 40, and extend in the vehicle length direction up to a rear bumper reinforcement (not shown).

Referring to FIG. 4, the rear side member 50 includes a kick-up part 50A on the front side in the vehicle length direction. The kick-up part 50A is bent toward an upper rear side so as to draw a curve. As the rear side members 50 are thus bent upward (kicked up), a space to dispose a rear suspension member and an axle (neither is shown) is secured under parts on the rear side from the kick-up parts 50A.

The kick-up part 50A is bent not only toward the upper rear side but also toward an inner side in the vehicle width direction. Thus, a space to dispose rear wheels 66 is secured on the outer side of the rear side members 50 in the vehicle width direction.

The rear side member 50 has a hat shape as seen from the rear side, and is disposed with an open end facing upward. As this open end is covered by a rear floor panel (not shown), a closed cross-sectional structure is formed.

Various components are attached to the above-described framework members. For example, the battery pack 10 is hung from and supported by the pair of front side members 40, 40 and the rear cross member 60. Referring to FIG. 4, the trailing arm mechanism 70 that is a part of a suspension mechanism is installed on the rear side member 50.

The trailing arm mechanism 70 has a rotating shaft (pivot shaft) provided on the front side of the rear wheel 66. For example, the rotating shaft of the trailing arm mechanism 70 is contained inside the rear side member 50.

Specifically, a portion of a bottom wall of the kick-up part 50A of the rear side member 50 is hollowed out, and a support cover (not shown) having a convex shape is disposed in the hollow. This support cover is attached to the kick-up part 50A by bolt fastening etc.

Further, an arm bracket 72 is attached on a lower surface of the support cover. The arm bracket 72 is a support member that supports the rotating shaft of the trailing arm 71. The arm bracket 72 is a substantially O-shaped frame member, and a bolt 74 serving as a rotating shaft is inserted into the arm bracket 72 in the vehicle width direction.

Moreover, a bush 73 of the trailing arm 71 is placed in a central opening of the arm bracket 72. As the bolt 74 is inserted into the cylindrical bush 73, a plain bearing mechanism is formed. Furthermore, an end of the trailing arm 71 on the rear side in the vehicle length direction is connected to a rear axle carrier (not shown).

The arm bracket 72 is fastened at four corners to the support cover (and to the kick-up part 50A through the support cover) by bolts 75A to 75D. The bolts 75A to 75D may be general-purpose bolts meeting the specifications of JIS or the like.

To remove the arm bracket 72 and the trailing arm 71 from the kick-up part 50A for maintenance or replacement, the vehicle is lifted up by a lift mechanism (not shown) and then a tool is inserted into the bolts 75A to 75D of the arm bracket 72 from a bottom side of the vehicle.

As will be described later, in the vehicle lower structure according to this embodiment, an extension 23 that is an extension framework member projects toward the outer side in the vehicle width direction from a case 11 of the battery pack 10 (that is, a distal end of the extension 23 is located outward of an end of the case 11 of the battery pack 10), and the arm bracket 72 is disposed above the extension 23. Therefore, to remove the arm bracket 72, the work of removing the extension 23 from a cross bracket 24 is performed as a pre-process.

Referring to FIG. 1, the battery pack 10 is installed under the floor (under the floor panel 67). As will be described below, the battery pack 10 is hung from and supported by the pair of front side members 40, 40. Moreover, the battery pack 10 is hung from and supported by the pair of rear side members 50, 50 through the rear cross member 60.

The battery pack 10 is formed in a size almost as large as the entire surface of the floor as seen from above. Specifically, in the vehicle length direction, the battery pack 10 extends from the dashboard panel 65 that is a front wall of the vehicle cabin to the rear cross member 60 located under a rear seat. In the vehicle width direction, the battery pack 10 has a dimension slightly shorter than an interval between the pair of front side members 40, 40 in the vehicle width direction.

Figure 2:
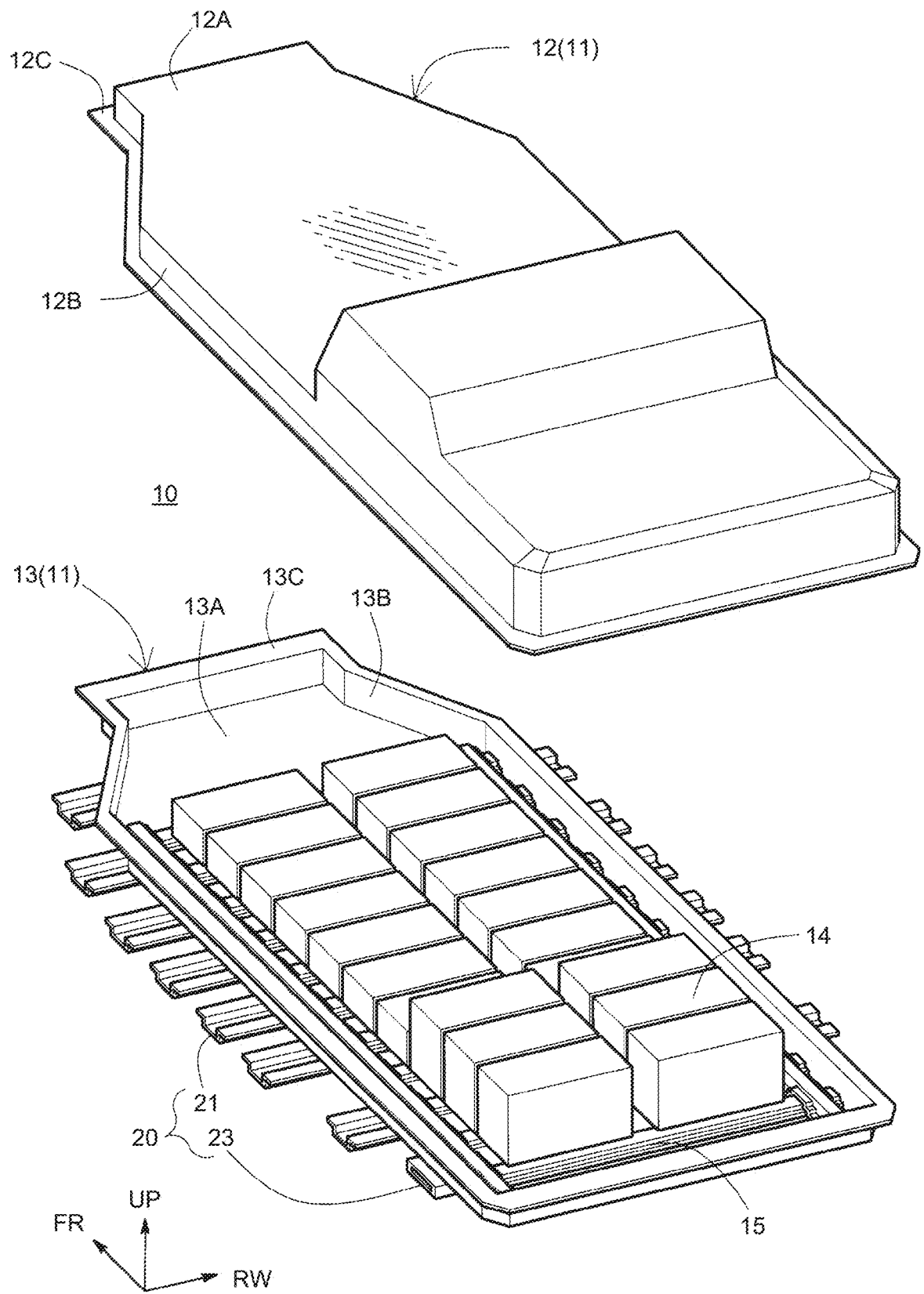
FIG. 2 is an exploded perspective view describing an inside of a battery pack.

FIG. 2 illustrates an exploded perspective view of the battery pack 10. The battery pack 10 includes a case 11 (a case cover 12 and a case tray 13), battery stacks 14, and in-pack cross members 15.

A plurality of battery stacks 14 is housed inside the case 11. Each of battery stacks 14 is a stack of a plurality of battery cells (not shown). The battery cell is formed, for example, by a nickel-metal hydride secondary battery, a lithium-ion secondary battery, or an all-solid battery.

The case 11 is a casing that houses the battery stacks 14, and includes the case cover 12 that is an upper member and the case tray 13 that is a lower member. Both the case cover 12 and the case tray 13 are formed by a metal thin plate material, such as an aluminum panel.

The case cover 12 includes an upper wall 12A extending in a substantially horizontal direction, and a side wall 12B connected to a peripheral edge of the upper wall 12A and extending downward. Moreover, a connection flange 12C projecting in the vehicle width direction and connected to a connection flange 13C of the case tray 13 is provided at a lower end of the side wall 12B.

The case tray 13 is formed substantially in a boat shape. The case tray 13 includes a bottom wall 13A extending in a substantially horizontal direction, and a side wall 13B connected to a peripheral edge of the bottom wall 13A and extending upward. Moreover, the connection flange 13C projecting in the vehicle width direction and connected to the connection flange 12C of the case cover 12 is provided at an upper end of the side wall 13B.

A plurality of the in-pack cross members 15 are provided on an inner surface (upper surface) of the bottom wall 13A of the case tray 13, along the vehicle length direction. The in-pack cross members 15 are framework members that protect the battery pack 10, and extend across both ends of the bottom wall 13A of the case tray 13 in the vehicle width direction.

The battery pack framework structure 20 is provided on an outer surface (bottom surface) of the bottom wall 13A of the case tray 13. The battery pack framework structure 20 is a framework member that protects the battery pack 10 along with the in-pack cross members 15.

Referring to FIG. 4, the battery pack framework structure 20 includes out-pack cross members 21, out-pack members 22, the extensions 23, the cross brackets 24, and a pack rear bracket 25.

The out-pack members 22 are framework members extending in the vehicle length direction. For example, the out-pack members 22 are provided on the outer surface (bottom surface) of the bottom wall 13A of the case tray 13, respectively at both ends and at a center in the vehicle width direction. The out-pack members 22 have a function of coupling together the out-pack cross members 21 disposed along the vehicle length direction, in addition to a function of maintaining the rigidity of the battery pack 10 in the vehicle length direction.

The out-pack cross members 21 are framework members that are fixed to the outer surface (bottom surface) of the bottom wall 13A of the case tray 13 and extend across the case 11 in the vehicle width direction. The out-pack cross member 21 has a hat shape as seen from a lateral side and is placed such that the hat shape is upside down, and an open end is closed by a bottom surface of the bottom wall 13A of the case tray 13.

To receive an obstacle (barrier) that approaches the battery pack 10 from a lateral side during a lateral collision of the vehicle, before the obstacle reaches the battery pack 10, the out-pack cross members 21, except for an out-pack cross member 21B at a rear end shown in FIG. 4, are formed such that both ends in the vehicle width direction project toward the outer side from both ends of the case 11 in the vehicle width direction (that is, the both ends of the out-pack cross members 21 are located outward of the both ends of the case 11 in the vehicle width direction). Specifically, referring to FIG. 2, the out-pack cross members 21 are formed so as to project farther toward the outer side in the vehicle width direction from both ends of the connection flange 12C of the case cover 12 and the connection flange 13C of the case tray 13 in the vehicle width direction.

Except for out-pack cross members 21A, 21B shown in FIG. 4, the out-pack cross members 21 are each provided with an opening 29 (see FIG. 3) at each end in the vehicle width direction so as to extend through the out-pack cross member 21 in the vehicle height direction. The bolt 68 is inserted through the opening 29. The bolt 68 is also inserted through a collar 69 and the opening 42C of the lower front side member 42. Further, the bolt 68 is screwed into the weld nut 43 provided on the lower front side member 42. Thus, the battery pack 10 is hung from and supported by the front side member 40.

The out-pack cross member 21B at a rearmost end in the vehicle length direction is provided with the pack rear bracket 25 that is an extension member protruding rearward from a rear end of the case 11. Lower ends of battery brackets 26 are fastened to the pack rear bracket 25. Upper ends of the battery brackets 26 are fastened to the rear cross member 60. Thus, the battery pack 10 is hung from and supported by the rear side member 50 at the rear end through the battery brackets 26 and the rear cross member 60.

The out-pack cross member 21A next to the out-pack cross member 21B at the rearmost end includes the cross bracket 24 and the extension 23 at each end in the vehicle width direction. The out-pack cross member 21A has such a structure as to project as a whole, i.e., including the cross brackets 24 and the extensions 23, toward the outer side in the vehicle width direction from the case 11, and thus to receive a barrier during a lateral collision before the barrier reaches the battery pack 10.

Figure 6:
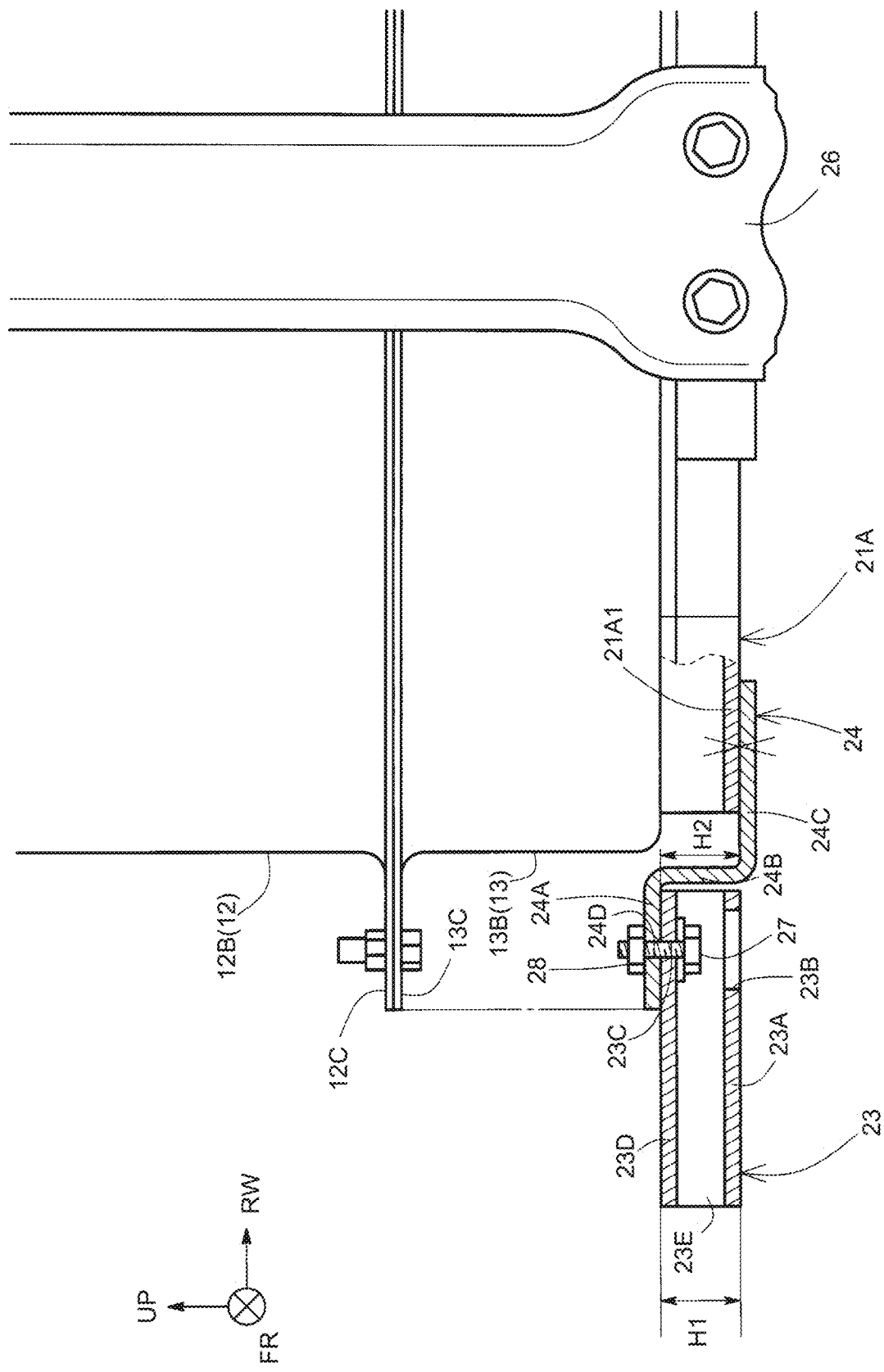
FIG. 6 is a rear view illustrating the structure on the rear side of the vehicle lower part.

FIG. 6 illustrates a rear view of the vehicle lower structure. This rear view shows sections of the out-pack cross member 21A, the cross bracket 24, and the extension 23 taken along an UP-RW plane.

Ends of the out-pack cross member 21A in the vehicle width direction are provided farther on the inner side in the vehicle width direction than the side wall 13B of the case tray 13. Moreover, the cross brackets 24, 24 extend toward the outer side in the vehicle width direction from both ends of the out-pack cross member 21A in the vehicle width direction. The cross bracket 24 has strength equivalent to that of, for example, the out-pack cross member 21A.

The cross bracket 24 has a Z-shape as seen in cross-section, and includes an outer flange 24A, an inner flange 24C, and a coupling part 24B that couples together these flanges and extends in the vehicle height direction. The outer flange 24A is a plate that is provided relatively on the outer side in the vehicle width direction and extends in the vehicle width direction. The inner flange 24C is a plate that is provided relatively on the inner side in the vehicle width direction and extends in the vehicle width direction.

The inner flange 24C is connected to a bottom wall 21A1 of the out-pack cross member 21A that is a plate extending in the vehicle width direction, and extends from a point of connection to the bottom wall 21A1 toward the outer side in the vehicle width direction. For example, as indicated by the cross mark in FIG. 6, the inner flange 24C and the bottom wall 21A1 are joined together by welding etc. Thus, the out-pack cross member 21A and the cross bracket 24 are joined together in an undetachable state. Therefore, the out-pack cross member 21A and the cross bracket 24 can be regarded as a single framework member.

An end of the inner flange 24C on the outer side in the vehicle width direction is connected to a lower end of the coupling part 24B. An upper end of the coupling part 24B is connected to an end of the outer flange 24A on the inner side in the vehicle width direction. The outer flange 24A extends toward the outer side in the vehicle width direction. A fastening hole 24D is formed at an outer end of the outer flange 24A so as to extend through the outer flange 24A in the vehicle height direction. As will be described later, the fastening hole 24D and a fastening hole 23C of the extension 23 are positioned with each other, and the extension 23 is fastened with a bolt 27 and a nut 28 to the cross bracket 24 that is a part of the framework member.

For example, the cross brackets 24 may be formed such that ends thereof on the outer side in the vehicle width direction lie within the range of both ends of the case 11 in the vehicle width direction. For example, as indicated by the long dashed-short dashed line in FIG. 6, the position in the vehicle width direction of the ends of the connection flanges 12C, 13C of the case 11 on the outer side in the vehicle width direction and that of the end of the cross bracket 24 on the outer side in the vehicle width direction may be aligned.

Since exactly matching the dimensions of the connection flanges 12C, 13C and the cross bracket 24 poses a difficulty in assembly, the above alignment may be achieved by allowing an assembly tolerance such that the cross bracket 24 virtually does not project toward the outer side in the vehicle width direction from the case 11. For example, a projection of about 1 mm or more to 10 mm or less from the end of the case 11 in the vehicle width direction virtually does not hinder removal of the bolts 75A to 75D of the arm bracket 72, and therefore such a slight projection (assembly tolerance) may be allowed.

The extensions 23 are extension framework members that are each detachably attached to the end of the cross bracket 24, which is a part of the framework member, on the outer side in the vehicle width direction, and that project toward the outer side in the vehicle width direction from both ends of the case 11 in the vehicle width direction. For example, as illustrated in FIG. 4, the extension 23 may be a framework member having a rectangular shape as seen from a lateral side. As illustrated in FIG. 6, the extension 23 includes a lower flange 23A and an upper flange 23D that are plates extending in the vehicle width direction, and a vertical wall 23E that connects these flanges to each other.

An insertion hole 23B is formed on the inner side of the lower flange 23A in the vehicle width direction so as to extend through the lower flange 23A in the vehicle height direction. Moreover, the fastening hole 23C is provided in the upper flange 23D, above the insertion hole 23B, so as to correspond to the insertion hole 23B and extend through the upper flange 23D in the vehicle height direction.

To attach the extension 23 to the cross bracket 24, the fastening hole 23C of the upper flange 23D and the fastening hole 24D of the cross bracket 24 are positioned with each other. Further, the bolt 27 is inserted through the fastening hole 23C of the upper flange 23D and the fastening hole 24D of the cross bracket 24 via the insertion hole 23B of the lower flange 23A. The cross bracket 24 is provided with the nut 28, such as a weld nut, and as the bolt 27 is screwed into the nut 28, the extension 23 is fastened to the cross bracket 24 (by bolt fastening).

Thus, the extension 23 is attached to and removed from the cross bracket 24 by means of the bolt 27 and the nut 28 that are general-purpose fastening parts, so that the need for a special tool for the work of attaching and removing the extension 23 is eliminated.

The extension 23 and the cross bracket 24 may be formed such that a separation distance H1 between the upper flange 23D and the lower flange 23A of the extension 23 and a separation distance H2 between the outer flange 24A and the inner flange 24C of the cross bracket 24 are equal. In this configuration, the positions in the vehicle height direction (heights) of the lower flange 23A of the extension 23 and the bottom wall 21A1 of the out-pack cross member 21A that both extend in the vehicle width direction are aligned when the extension 23 is attached to the cross bracket 24. In other words, the lower flange 23A and the bottom wall 21A1 are disposed in the same plane.

When the positions in the vehicle height direction of the lower flange 23A and the bottom wall 21A1 are thus aligned, during a lateral collision of the vehicle, a lateral collision load from a barrier is transmitted from the lower flange 23A of the extension 23 across the cross bracket 24 to the bottom wall 21A1 of the out-pack cross member 21A, along the extension direction of these members. Thus, the extension 23 and the out-pack cross member 21A cooperate with each other to push against the barrier so as to stop the advance of the barrier, preventing collision of the barrier with the battery pack 10.

In the vehicle lower structure according to this embodiment, to allow smooth load transmission from the lower flange 23A to the inner flange 24C, the extension 23 is fastened to the cross bracket 24 by the bolt 27 and the nut 28 without involving the lower flange 23A.

If a long bolt 27 extending across the lower flange 23A and the upper flange 23D is passed and screwed into the nut 28, lateral collision loads input into the upper flange 23D and the lower flange 23A are received by the shaft of the bolt 27. If there is a difference between these lateral collision loads input into the upper flange 23D and the lower flange 23A, the shaft of the bolt 27 may deform or fracture according to the difference between loads (shear loads) input into the shaft of the bolt 27 respectively from the upper flange 23D and the lower flange 23A.

When the bolt 27 deforms, the positions in the vehicle height direction of the lower flange 23A of the extension 23 and the bottom wall 21A1 of the out-pack cross member 21A may become misaligned. When the bolt 27 fractures, the extension 23 may come off. In this embodiment, therefore, the structure is adopted in which only the upper flange 23D of the upper and lower flanges 23D, 23A is fastened with the bolt so as to allow smooth load transmission from the extension 23 to the cross bracket 24 during a lateral collision.

Figure 5:
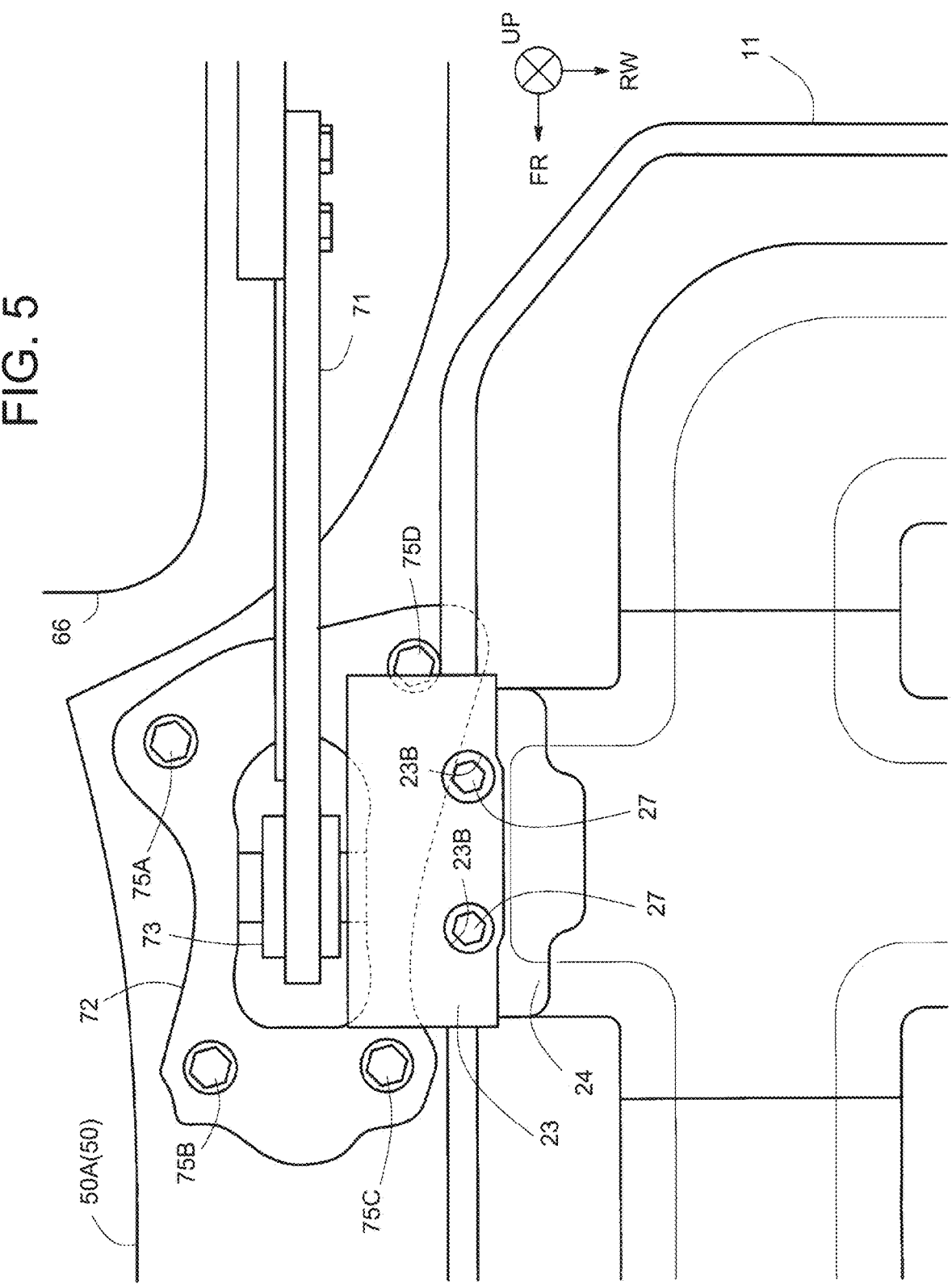
FIG. 5 is a bottom view illustrating the structure on the rear side of the vehicle lower part.

FIG. 5 illustrates a bottom view of the vehicle lower structure according to the embodiment. In this bottom view, the extension 23 is disposed in front of the arm bracket 72. Of the bolts 75A to 75D that fasten the arm bracket 72 to the rear side member 50, especially the bolt 75D is partially overlapped with the extension 23 as seen in the bottom view, and thus insertion of a tool into the bolt 75D is blocked by the extension 23.

FIG. 7 and FIG. 8 illustrate a state where the extension 23 has been removed from the cross bracket 24. In particular, as shown in FIG. 8, now that the extension 23 has been removed, all the bolts 75A to 75D that fasten the arm bracket 72 to the rear side member 50 are accessible (a tool can be inserted into these bolts).

Thus, in this embodiment, it is possible to access a vehicle component located above the extension 23 simply by removing the extension 23. Therefore, this embodiment can avoid increasing the burden on a worker, compared with when, for example, removing or mounting this vehicle component involves the work of removing the battery pack 10 etc. Moreover, having the framework members (and the extension framework members) projecting toward the outer side of the battery pack 10 in the vehicle width direction, this embodiment can reduce the possibility of collision of a barrier with the battery pack 10 during a lateral collision of the vehicle.

What is claimed is:

1. A vehicle lower structure comprising:
    a battery pack provided under a floor of a vehicle cabin, the battery pack including a case that houses a battery stack;
    a framework member fixed to a bottom surface of the case, the framework member extending across the case in a vehicle width direction;
    a first extension framework member detachably attached to one end of the framework member in the vehicle width direction such that at least one of distal ends of the first extension framework member in the vehicle width direction is located outward of one end of the case in the vehicle width direction, wherein the first extension framework member extends beyond the framework member in the vehicle width direction; and
    a second extension framework member detachably attached to the other end of the framework member in the vehicle width direction such that at least one of distal ends of the second extension framework member in the vehicle width direction is located outward of the other end of the case in the vehicle width direction.

2. The vehicle lower structure according to claim 1, further comprising an arm bracket provided above each of the first extension framework member and the second extension framework member, the arm bracket supporting a rotating shaft of a trailing arm.

3. The vehicle lower structure according to claim 1, wherein the first extension framework member and the second extension framework member are attached to the framework member by bolt fastening.

4. The vehicle lower structure according to claim 1, wherein:
    each of the framework member, the first extension framework member and the second extension framework member includes a plate extending in the vehicle width direction; and
    the first extension framework member and the second extension framework member are attached to the framework member such that heights of the plate of the framework member, the plate of the first extension framework member, and the plate of the second extension framework member are aligned.

5. The vehicle lower structure according to claim 1, wherein a dimension of the framework member in the vehicle width direction is equal to or shorter than a dimension of the battery pack in the vehicle width direction.

6. The vehicle lower structure according to claim 1, wherein the first extension framework member comprises:
    a first flange portion adjacent to the framework member;
    a second flange portion opposite the first flange portion; and
    a first wall extending in a vehicle height direction perpendicular to the vehicle width direction, wherein the first wall connects the first flange portion to the second flange portion.

7. The vehicle lower structure according to claim 6, wherein the first flange portion is detachably attached to the framework member at a first position on the first flange portion.

8. The vehicle lower structure according to claim 7, wherein the second flange portion comprises an opening at a second position on the second flange portion, and the second position overlaps with the firs position.

9. The vehicle lower structure according to claim 6, wherein the framework member comprises:
    a third flange portion adjacent to the first flange portion;
    a fourth flange spaced from the third flange portion in the vehicle width direction; and
    a second wall extending in the vehicle height direction, wherein the second wall connects the third flange portion to the fourth flange portion.

10. The vehicle lower structure according to claim 9, wherein a first distance in the vehicle height direction from an outer surface of the first flange portion to an outer surface of the second flange portion is equal to a second distance in the vehicle height direction from an inner surface of the third flange portion to an inner surface of the fourth flange portion.

11. A vehicle comprising:
a case configured to house a battery stack, wherein the case comprises a first side and a second side opposite the first side;
a framework member fixed to a bottom surface of the case, the framework member extending in a vehicle width direction;
a first extension framework member detachably attached to a first end of the framework member in the vehicle width direction, wherein a distal end of the first extension framework member extends beyond the first side of the case in the vehicle width direction, and the first extension framework member extends beyond the framework member in the vehicle width direction; and
a second extension framework member detachably attached to a second end of the framework member in the vehicle width direction, wherein a distal end of the second extension framework member extends beyond the second side of the case in the vehicle width direction.

12. The vehicle according to claim 11, further comprising an arm bracket above each of the first extension framework member and the second extension framework member, the arm bracket is configured to support a rotating shaft of a trailing arm.

13. The vehicle according to claim 11, wherein the first extension framework member and the second extension framework member are attachable to the framework member by bolt fastening.

14. The vehicle according to claim 11, wherein:
each of the framework member, the first extension framework member and the second extension framework member includes a plate extending in the vehicle width direction; and
the first extension framework member and the second extension framework member are attachable to the framework member such that heights of the plate of the framework member, the plate of the first extension framework member, and the plate of the second extension framework member are aligned.

15. The vehicle according to claim 11, wherein a dimension of the framework member in the vehicle width direction is equal to or shorter than a dimension of the battery pack in the vehicle width direction.

16. The vehicle according to claim 11, wherein the first extension framework member comprises:
a first flange portion adjacent to the framework member;
a second flange portion opposite the first flange portion; and
a first wall extending in a vehicle height direction perpendicular to the vehicle width direction, wherein the first wall connects the first flange portion to the second flange portion.

17. The vehicle according to claim 16, wherein the first flange portion is detachably attached to the framework member at a first position on the first flange portion.

18. The vehicle according to claim 17, wherein the second flange portion comprises an opening at a second position on the second flange portion, and the second position overlaps with the firs position.

19. The vehicle according to claim 16, wherein the framework member comprises:
a third flange portion adjacent to the first flange portion;
a fourth flange spaced from the third flange portion in the vehicle width direction; and
a second wall extending in the vehicle height direction, wherein the second wall connects the third flange portion to the fourth flange portion.

20. The vehicle according to claim 19, wherein a first distance in the vehicle height direction from an outer surface of the first flange portion to an outer surface of the second flange portion is equal to a second distance in the vehicle height direction from an inner surface of the third flange portion to an inner surface of the fourth flange portion.

* * * * *